United States Patent Office.

EDWARD S. MARSHALL AND ROBERT W. SAVAGE, OF TYLER, TEXAS.

LUBRICANT.

SPECIFICATION forming part of Letters Patent No. 339,200, dated April 6, 1886.

Application filed January 2, 1886. Serial No. 187,456. (No specimens.)

*To all whom it may concern:*

Be it known that we, EDWARD S. MARSHALL and ROBERT W. SAVAGE, both citizens of the United States, residing at Tyler, in the county of Smith and State of Texas, have invented certain new and useful Improvements in Lubricants, and in the process of obtaining the same; and we do hereby declare that the following is a clear and full description thereof, sufficient to allow those skilled in the art to which it appertains to make and use the same.

The lubricant obtained by us by the herein-described process consists, first, of a gelatinous and fibrous material intermixed with crude or refined animal, mineral, or vegetable oils, and forming a substantially homogeneous mass suitable without the addition of waste or other foreign material for use as a "dope" or "packing," so called, in railway-journals or packing-boxes and other like purposes; and, second, of a gelatinous material intermixed with crude or refined animal, mineral, or vegetable oils, forming a lubricant to be used in the ordinary manner.

The process by which we obtain the above-named lubricants is, first, the cactus-plant, from which we obtain that portion of our improved lubricant above referred to in the terms "gelatinous" and "fibrous," is freed from its thorns by the application of heat, or, if preferred, by the use of acids or alkalies; second, the stalk and branches of said cactus-plant are sliced or cut into small pieces or portions, (or it may be crushed by passing it through rollers;) third, the crushed or cut cacti are placed in a tub or vat containing either an animal, mineral, or vegetable oil. It is immaterial whether the animal or vegetable oil contained in said tubs or vats before the introduction or placing therein of the cut or crushed cacti is in a crude or refined condition, so long as said animal and vegetable oils are suitable by themselves to be used as a lubricant for the purpose desired.

For railway purposes we prefer to use vegetable or mineral oil in its crude condition in the manufacture of our lubricant; but the kind of oil used and its condition, whether crude or refined, is not a material part of our process of manufacturing such lubricant, the main purpose of the use of oil therein being to preserve for a longer time than could be done without such oils the gelatinous and fibrous material from decay or other injurious change, and therefore the quality of the oil used, the kind, and its condition is a matter controlled entirely by the purpose and use to which our lubricant is intended to be adapted, any and all oils, either mineral, vegetable, or animal, in a crude or refined condition, being adapted to a greater or less extent to act as such preservative, and any of said oils used by us being also and further adapted to act as a lubricant.

The cut or crushed cacti are allowed to remain in the tubs or vats a sufficient length of time to reduce the whole mass into a homogeneous mass, or substantially so, when the same is ready for use.

If the lubricant obtained by us in our here-in-described process is desired for immediate use, the gelatinous and fibrous material obtained from the cut or crushed cacti may be placed in a tub and allowed to remain until the same has become sufficiently homogeneous before the addition of the oil thereto, and the length of time required for such cut or crushed cacti to become such intermixed fibrous and gelatinous mass is controlled to a considerable extent by the temperature of the place or room containing said tubs and contents, after which the oil is added thereto. It is not essential that any given amount of either of the ingredients of our improved lubricant be used therein, or that any given proportion of said ingredients be so intermixed, as described.

To produce a lubricant consisting of the gelatinous product named herein and oil, an additional step is required—namely, to separate by pressure the gelatinous and fibrous materials heretofore named obtained from the said cacti; and when it is desired to secure such lubricant so freed from the fibrous portion of said cacti we prefer to separate the fibrous and gelatinous portions thereof before the addition or mixture of the oil thereto. It is evident that it will be necsssary, when the lubricant is to be free from the fibrous portion of said cut or crushed cacti, to allow the said cacti to remain in said tubs or vats until the said products of said cactii have become sufficiently separated the one from the other, and forming the hereinbefore referred to homogeneous mass of fibrous and gelatinous material to permit of a mechanical separation by pressure of the two products thereof.

Having thus described our invention, what we claim, and desire to secure by Letters Patent, is—

1. The process of preparing a lubricant, consisting of the following steps: first, removing from the cactus-plant the thorns thereon; second, reducing said plant by cutting or crushing into sections or pieces, and, third, mixing the cacti so prepared with oil, all substantially as described.

2. The process of preparing a lubricant from the common cactus-plant and crude or refined animal, vegetable, or mineral oil, consisting of the following steps: first, removing from the said plants the thorns thereon; second, reducing said plants by cutting or crushing into sections or pieces; third, placing the cacti so processed as above in tubs or vats and allowing it to there remain until it forms a substantially homogeneous mass, and, fourth, mixing such mass with oil, substantially as described, and for the purpose set forth.

3. The process of obtaining a lubricant from the common cactus-plant and animal, vegetable, or mineral oil, consisting of the following steps: first, removing from said plants the thorns thereon; second, reducing said plant by cutting or crushing into sections or pieces; third, placing the same in tubs and allowing it to remain until it forms a fibrous gelatinous mass, and, fourth, separating the gelatinous and fibrous portions thereof and mixing such gelatinous portion with an animal, vegetable, or mineral oil, substantially as described.

4. The process of obtaining a lubricant from the common cactus-plant and animal, vegetable, or mineral oil, consisting of the following steps: first, removing the thorns from said cactus; second, reducing it by crushing or cutting into sections or pieces; third, mixing the said cacti so processed with crude or refined animal, vegetable, or mineral oil, and, fourth, of allowing the same to remain in tubs until an oily, gelatinous, and fibrous mass is obtained, and then removing said fibrous portion therefrom by pressure, all substantially as described.

5. As a new article of manufacture, a lubricant consisting of a mixture of crude or refined animal, vegetable, or mineral oil and a gelatinous material obtained from the cactus-plant, all substantially as described.

6. As a new article of manufacture, a lubricant consisting of a mixture of crude or refined animal, vegetable, or mineral oil and the fibrous and gelatinous material obtained from the cactus-plant, all substantially as described, and for the purpose set forth.

EDWARD S. MARSHALL.
ROBERT W. SAVAGE.

Witnesses:
C. G. WHITE,
J. T. BOWEN.